US006944421B2

(12) United States Patent
Axelrod

(10) Patent No.: US 6,944,421 B2
(45) Date of Patent: Sep. 13, 2005

(54) METHOD AND APPARATUS FOR PROVIDING TRAINING INFORMATION REGARDING A PET

(75) Inventor: Glen S. Axelrod, Colts Neck, NJ (US)

(73) Assignee: T.F.H. Publications, Inc., Neptune City, NJ (US)

(*) Notice: Subject to any disclaimer, the term of this patent is extended or adjusted under 35 U.S.C. 154(b) by 296 days.

(21) Appl. No.: 10/295,533

(22) Filed: Nov. 15, 2002

(65) Prior Publication Data

US 2003/0118979 A1 Jun. 26, 2003

Related U.S. Application Data

(60) Provisional application No. 60/336,334, filed on Nov. 15, 2001.

(51) Int. Cl.⁷ ................................................. G09B 5/00
(52) U.S. Cl. ................... 434/317; 434/307 R; 434/365; 434/369; 119/712; 705/27
(58) Field of Search ................................ 434/118, 219, 434/307 R, 308, 323, 362, 365; 340/573.1, 573.3; 600/300, 303; 446/369; 702/178; 704/270.1; 705/26, 27; 382/181; 235/454; 244/30; 119/712, 719

(56) References Cited

U.S. PATENT DOCUMENTS

| | | | |
|---|---|---|---|
| 3,608,524 A | | 9/1971 | Waltz |
| 3,753,421 A | | 8/1973 | Peck |
| 3,874,339 A | | 4/1975 | Coulbourn |
| 4,202,293 A | | 5/1980 | Gonda et al. |
| 4,898,120 A | | 2/1990 | Brose |
| 4,947,795 A | | 8/1990 | Farkas |
| 5,067,441 A | | 11/1991 | Weinstein |
| 5,326,270 A | * | 7/1994 | Ostby et al. ................ 434/362 |
| 5,349,926 A | | 9/1994 | McCarney et al. |
| 5,351,653 A | * | 10/1994 | Marischen et al. ......... 119/719 |
| 5,353,744 A | | 10/1994 | Custer |
| 5,381,129 A | | 1/1995 | Boardman |
| 5,392,735 A | * | 2/1995 | Xitco et al. ................. 119/712 |
| 5,625,577 A | * | 4/1997 | Kunii et al. ................... 703/2 |
| 6,014,637 A | * | 1/2000 | Fell et al. ..................... 705/26 |
| 6,047,664 A | * | 4/2000 | Lyerly ........................ 119/719 |
| 6,263,836 B1 | * | 7/2001 | Hollis ........................ 119/712 |
| 6,273,027 B1 | * | 8/2001 | Watson et al. .............. 119/712 |
| 6,287,254 B1 | * | 9/2001 | Dodds ......................... 600/300 |
| 6,311,644 B1 | * | 11/2001 | Pugh ........................... 119/712 |
| 6,502,060 B1 | * | 12/2002 | Christian ..................... 702/178 |
| 6,535,131 B1 | * | 3/2003 | Bar-Shalom et al. ..... 340/573.1 |
| 6,650,243 B2 | * | 11/2003 | Aull ......................... 340/573.3 |
| 6,678,413 B1 | * | 1/2004 | Liang et al. ................ 382/181 |
| 6,720,879 B2 | * | 4/2004 | Edwards ................... 340/573.3 |
| 6,739,941 B1 | * | 5/2004 | Brownsberger ............ 446/369 |
| 6,748,902 B1 | * | 6/2004 | Boesch et al. ............. 119/719 |
| 6,811,084 B2 | * | 11/2004 | Tatsuta et al. .............. 235/454 |
| 6,811,113 B1 | * | 11/2004 | Silansky et al. .............. 244/30 |
| 2001/0032084 A1 | * | 10/2001 | Day ........................ 704/270.1 |
| 2002/0046713 A1 | * | 4/2002 | Otto ........................... 119/720 |
| 2003/0004652 A1 | * | 1/2003 | Brunner et al. .............. 702/19 |
| 2003/0034893 A1 | * | 2/2003 | Stapelfeld et al. ........ 340/573.3 |
| 2003/0074107 A1 | * | 4/2003 | Noma et al. ................ 700/245 |
| 2003/0130568 A1 | * | 7/2003 | Vodyanoy et al. .......... 600/303 |
| 2004/0034575 A1 | * | 2/2004 | Oh .............................. 705/27 |

FOREIGN PATENT DOCUMENTS

SE 113556 3/1945

* cited by examiner

*Primary Examiner*—Joe H. Cheng
(74) *Attorney, Agent, or Firm*—Grossman, Tucker, Perrault & Pfleger, PLLC

(57) ABSTRACT

A method and apparatus for providing textual, audio and/or video information regarding a pet to a user comprising supplying an electronic database which database has stored textual, audio and/or video information data files representative of animal/pet behavior, animal/pet identification, animal/pet selection, animal/pet characteristics, animal/pet training, and animal/pet care, and combinations thereof, selecting one of the stored textual, audio and/or video information data files and outputting the information regarding an animal/pet to said user either in either a textual, audio or video form.

5 Claims, 1 Drawing Sheet

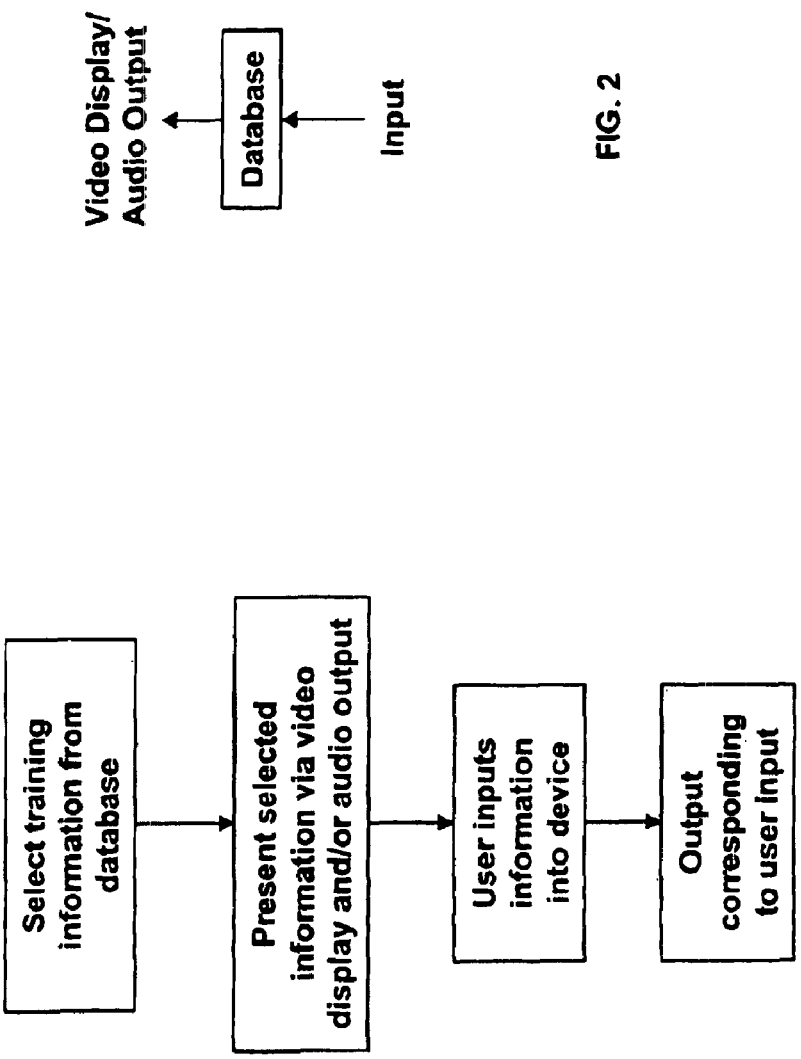

METHOD AND APPARATUS FOR PROVIDING TRAINING INFORMATION REGARDING A PET

CROSS REFERENCE TO RELATED APPLICATIONS

The present application claims the benefit of the filing date of U.S. Provisional Application Ser. No. 60/336,334, filed Nov. 15, 2001, the teachings of which are incorporated herein by reference.

FIELD OF THE INVENTION

The present invention relates to an electronic book designed to provide a consumer with audio, video and textual information regarding animals and/or pets. In more specific context, the present invention relates to an electronic book medium which offers audio, video and textual information that may be applied to facilitate animal training and/or to provide the consumer with real-time video imaging of animals/pets that will improve one's understanding of animal behavior, animal care, etc.

BRIEF DESCRIPTION OF RELATED ART

In the past, information regarding animals and their environment has been limited to text and "still" pictures and/or graphics. Such restriction, however, has led to various problems in allowing the consumer to better understand animal/pet behavior, which tends to be difficult to understand without the aid of more active video type information.

For example, the fundamental problem with conventional pet training is the inherent inconsistency in delivery of the corrective stimulus. For any given animal, the magnitude and frequency of the corrective stimulus is dependent on the nature of the person delivering the stimulus. This lack of consistency in the magnitude and frequency of the corrective stimulus has the potential for being, and is believed to be, confusing for the animal. This is especially true if both a professional trainer and a pet owner are providing differing stimuli during the same period of training. For example, pet owners (especially dog owners) and trainers have used the training collar and leash as the standard method of obedience training for many years. The correction is accomplished by simply pulling or jerking on the animal's leash. This method of correction may require several hundred jerks to correct the animal's behavior. A professional trainer may tend to jerk the leash harder than the owner, as some animal owners are not aware of the correct method or strength required in jerking the leash to provide meaningful correction for the animal. Thus, the human error involved in the animal training process can cause the process to suffer due to a lack of consistency.

Accordingly, a wide margin for human error still exists, despite the large number of texts which have published over the millennia which discuss the control of animals and directing their attention away from certain behaviors. Such texts emphasize the use of the choke-chain (which acts as a collar that may be tightened as a noose), the whip (a flexible semi-stiff rod, usually with a handle, that is used to strike an animal when certain undesired behaviors are elicited, such as when a horse rears up against a trainer), and the spur (pointed devices secured to a rider's heel which are also designed to provide a nocuous stimulus to an animal). These training devices are not recommended for obvious reasons.

To solve the problem of inconsistent stimuli delivered by human trainers, and the difficulty in transmitting information from a static media such as a book with still pictures, a number of electronic pet training devices have been disclosed. Most such devices are based upon the provision of a uniform positive or negative stimulus to an animal in a consistent manner, either to reinforce positive behavior or to deter negative behavior. One such device, disclosed in U.S. Pat. No. 3,874,339 issued to Coulbourn, discloses an anti-pull leash mechanism for attachment to a dog collar. The collar attachment includes at least one electrode for delivering an electric shock to a dog. The mechanism is spring activated such that as the dog strains against the leash, a spring switch closes an electrical circuit, thus delivering an electric pulse to the electrodes. Likewise, Swedish patent number 113,556 issued to Petersson, shows a dog collar with electrical probes on the interior thereof. These probes are manually operated by switch contacts in the leash handle. The power pack and shock circuitry are carried by the person walking the dog.

While these types of devices address the problem associated with differing magnitudes of corrective stimuli, few owners desire repetitive shock treatment for a loved pet. Nevertheless, other such shock-based devices are disclosed in U.S. Pat. Nos. 3,608,524, 4,202,293 and 4,947,795, which describe automatic devices to brake dogs of undesired "barking" behavior. Such "bark training" devices apply electric shocks and/or audible stimulus to a dog in response to loud vocalizations and employ vibration sensitive transducers directed at the neck of the dog to detect sound emanating from the dog's vocal cords. However, the problem with such devices is that they are fairly non-specific and may be inadvertently triggered by a loud sound or by the animal making other acceptable noises (e.g. the sound signaling related to the fact that the dog needs to relieve itself).

Moreover, even with the use of such devices, the likelihood of human error, including incorrect or inconsistent use of the device, remains a problem. This is particularly the case because the activation of such a device is unaccompanied by a controlled verbal command which may cause confusion in an animal with regard to what type of behavior is expected from the trainer (e.g., "down" or "sit"). In other words, while the various devices described above are intended to deal with the problem of properly training an animal, none of these devices are principally concerned with improving the training techniques of a human trainer.

Continuing, other known animal training devices require little vigilance over an animal and permit remote induction of a nocuous stimulus to prevent an animal from roaming outside of a certain perimeter. The most basic of these is the leash, which is a line for restraining an animal which is conventionally attached to a collar placed around an animal's body. A leash restricts animal movement by the sheer physical constraint of its length. An animal attempting to reach a destination outside of the perimeter allowed by the leash is dealt a jerking blow. Many municipalities require, pursuant to so-called "leash laws," that any pet outside of a home be on a leash. Accordingly, several electronically-based devices for restricting roaming have been reported, which require little vigilance over the animal and which permit remote induction of aversive stimuli. These "electronic leashes" involve attachment of an aversive, nocuous, stimulus-generating device to the body of the animal. Such aversive stimulus-generating devices are responsive to perimeter range signals.

For example, U.S. Pat. No. 3,753,421 to Peck discloses a system which uses a wire to define the boundary of the area to which an animal is to be restrained. U.S. Pat. No.

4,898,120 to Brose sets forth a more sophisticated system in which the area in which an animal is to be restrained is determined by evaluating a signal sent from a transmitter on the animal to a central receiver. U.S. Pat. No. 5,067,441 to Weinstein uses a transmitting system which generates radio signals to be located in or adjacent an area in which an animal is to be restrained. U.S. Pat. No. 5,349,926 to McCarney et al. utilizes coded near infrared energy. Improvements upon these systems are set forth in U.S. Pat. No. 5,381,129 to Boardman and U.S. Pat. No. 5,353,744 to Custer.

While such restraining devices dispense with the need for a qualified trainer to be in close proximity to an animal, and require minimal vigilance by a trainer, these devices by their very design are restricted to use in breaking animals of a tendency to roam alone. They are therefore of little assistance in breaking animals of other undesired behaviors, and as alluded to above, do not adequately and comprehensively instruct a human trainer or owner in establishing a relationship with the animal for purposes of training.

It is believed that such difficulty in coming forward with a comprehensive solution to the problem of adequately training the consumer in the skills of proper pet management stems from the limitation of books, texts, etc. to provide an active real-time media for delivery of such critical parameters as: how loud to command the animal, when to command the animal (i.e, the criticality of timing), what to look for in an animal's body language, etc. Simply stated, as to the devices to instruct human users in animal training, instructional manuals and guide books on training and discipline have long been in existence. However, many of the subtleties of animal training, including body language, posturing and tone of voice, are difficult for an author to convey using a paper-based book. Moreover, the capacity of information which can be stored and retrieved in a paper-based book is also limited due to size and weight considerations, and carrying a heavy book around while training an animal is rarely practical. Furthermore, reading and navigation within a book can also be difficult for a person who is in the middle of an animal training session, particularly outdoors. Along the same lines, indexing in a paper book requires shuffling or flipping pages back and forth, which may damage the paper. Annotating a paper book by highlighting or writing notes in and around the text is usually permanent and requires defacing or destroying the original contents. Additionally, it would be nearly impossible for an animal trainer to have an entire library's worth of books at his or her disposal during such a training session.

Moreover, printed materials can become out of date as quickly as they are published. Furthermore, books for training an animal can be difficult to use in the dark, in low-light conditions, or by users with visual disabilities that make reading from a book in print difficult.

As can therefore be appreciated from the above, and while provided in the specific context on the issue of animal training, it is clear that there is a need for a portable, electronic book media, that deals with the various problems in transmitting active information about the animal, that presents active information about the animal-human relationship, so that the result is a truly informed consumer, and a much more appreciated respect for animal/pet behavior and animal/pet characteristics than has been previously available.

In addition, it can also be appreciated from the above, that to a large extent, the limitations of printed media is that such media is not dynamic in the sense that it freezes the consumer to that technology and, e.g., training theories that may be advanced in the field of animal science. Accordingly, there remains a need for an electronic book media that would allow consumers with the opportunity to receive and integrate the latest information regarding animal characteristics and behavior, in effect, an electronic book media that can be regularly updated with a combination of textual, audio and video information to allow humans to better understand animals, and in a very real sense, allow animals to better understand humans.

SUMMARY OF THE INVENTION

Accordingly, it is a basic object of the present invention to provide an electronic book media which provides textual, audio and video information, that is fully portable and capable of regular and reliable updates from a main server or equivalent, and which is directed at transferal of information regarding animal/pet behavior, animal/pet identification, animal/pet selection, animal/pet characteristics, animal/pet training, animal/pet development information, animal/pet care, as well as any other animal/pet data suitable for conveyance by the combination of text, video and audio information.

More specifically, it is an object of the invention to provide an electronic book pet information device which promotes the humane training of an animal and which does not inflict pain or discomfort upon the animal to be trained.

It is also a further object of the present invention to provide an electronic book pet information device to reduce human error by assisting a human trainer in learning to deliver correct and consistent stimuli to the animal to be trained.

It is also an object of the present invention to provide an electronic book pet information device which is customizable in that a user can dynamically change the presentation sequence, knowledge level of the presented material, and/or subject matter.

It is also an object of the present invention to provide an electronic book pet information device which utilizes multimedia presentations including auditory, visual and interactive involvement with the material being presented, thereby promoting assimilation rather than memorization of the material.

It is also an object of the present invention to provide an electronic book pet information device which is capable of teaching a user the subtleties of animal training, including body language, posturing and tone of voice, which subtleties would be difficult to teach using a paper-based book.

It is also an object of the present invention to provide an electronic book pet information device which is capable of storing large amounts of data for later retrieval by a user.

It is also an object of the present invention to provide an electronic book pet information device which is portable, compact, and lightweight, and which can be updated via electronic or modem coupling to a dedicated central server.

It is also an object of the present invention to provide an electronic pet information device which is easily navigable by a user, and may itself provide dedicated audio navigation for the reader to access selected information on various aspects of animal behavior and comparative animal characteristics.

It is also an object of the present invention to provide an electronic book pet information device which allows for user annotation or note-taking, such as audio note-taking, without damage or risk of damage to the presentation data contained therein.

It is also an object of the present invention to provide an electronic book pet information device which allows for "point-and-click" type indexing/searching back and forth without damage or risk of damage to the presentation data contained therein.

It is also and object of the present invention to provide an electronic book pet information device which promotes environmentalism by replacing paper books.

It is also an object of the present invention to provide an electronic pet information device which allows for variations in font size and style to accommodate users with visual disabilities and users training an animal in poor visibility or low-light conditions.

It is also an object of the present invention to provide an electronic book pet information device which is capable of quickly receiving updates to the presentation data contained therein via a network, modem, storage device, or other download mechanism.

It is also an object of the present invention to provide an electronic pet information device which includes copy protection for the content using a digital rights management scheme.

Other objects and advantages over the prior art will become apparent to those skilled in the art upon reading the description below.

BRIEF DESCRIPTION OF THE DRAWINGS

FIG. 1 is an embodiment of the present invention directed to a method of providing training information regarding a pet.

FIG. 2 is an embodiment of the present invention directed to an apparatus for providing training information regarding a pet.

DETAILED DESCRIPTION OF THE INVENTION

In basic embodiment, the present invention relates to an electronic book pet/animal information device. The device herein provides textual, audio and/or video information regarding animals/pets, in an active real-time presentation format. An individual may therefore access selectively arranged textual, audio and/or video information regarding animals/pets on any desired matter, such as animal characteristics, animal training techniques, animal care information, etc.

In a more specific embodiment, the present invention accomplishes the various objectives discussed above and comprises a portable electronic device having a video display, an audio output, input controls, and a database. A user of the device may use the input controls to select a training program. A multimedia presentation stored in the database, which can include text, still images, moving video and sound, is presented to the user via the video display and/or audio output. The user can interact with the multimedia presentation, e.g. to replay selected portions of the presentation, or to input information into the device to customize the presentation for a particular use (e.g. type and/or breed of animal, animal size and disposition, age and skill level of user, etc.).

In an exemplary presentation, to aid the user in teaching an animal a specified activity, a narrated video of a trainer and a dog may be shown to the user demonstrating the proper technique to use, including body language and posture. The presentation may also include sound output to demonstrate to the user the proper tone of voice to use when prompting the animal to said desired behavior. The presentation might further include the display of text, as from a pet training manual, which the user can read to learn about the proper training technique. The user then would attempt to duplicate the technique with the animal he or she wishes to train. The device may then query the user as to the success of the attempt, and the user may respond by using the input controls to select from several choices regarding the success of the attempt (e.g. the animal complying with the command; animal compliance after several prompts from the user; animal refusal, etc.). At this point, the device may display a multimedia presentation corresponding to the level of success of the attempt, or to the problem the user is encountering. Thus, by each interaction with the device, the user learns more about how to interact correctly with the animal, for optimal training.

It should be understood from the outset that although preferably the functional components of the preferred embodiments of the system of the present invention are embodied as one or more distributed computer program processes, data structures, dictionaries or other stored data on one or more conventional general purpose computers (e.g. IBM-compatible, Apple Macintosh, PalmOS, Windows CE and/or RISC microprocessor-based computers), conventional telecommunications (e.g. modem, wireless and/or network communications), memory storage means (e.g. RAM, ROM) and storage devices (e.g. computer-readable memory, disk array, direct access storage) networked together by conventional network hardware and software (e.g. LAN/WAN network backbone systems and/or Internet), other types of computers and network resources may be used without departing from the present invention.

In a preferred embodiment, source code is written in an object-oriented programming language using relational databases. Such a preferred embodiment includes the use of programming languages such as Java, and certain functions, such as remote payer access, are accomplished using an application server platform (ASP) such as Safika's NetDynamics™. Other programming languages which can be used in constructing a system according to the present invention include C/C++, HTML, Perl, UNIX shell scripting, assembly languages Fortran, Pascal, Visual Basic, and QuickBasic. Those skilled in the art will recognize that the present invention may be implemented in hardware, software, or a combination of hardware and software.

It should be appreciated by those skilled in the art that one or more of the functional components may be constructed out of custom, dedicated electronic hardware and/or software, without departing from the present invention. Thus, the present invention is intended to cover all such alternatives, modifications, and equivalents as may be included within the spirit and broad scope of the invention as defined herein.

What is claimed is:

1. A method of providing training information regarding an animal to a user comprising:

supplying an electronic database which database has stored training information data files, said training information data files selected from the group consisting of textual, audio, video and combinations thereof, representative of animal behavior, animal identification, animal selection, animal characteristics, animal training, and animal care, and combinations thereof;

selecting one of said stored training information data files and outputting said information regarding an animal to said user to an electronic device, said electronic device selected from the group consisting of a video display, audio output, and combinations thereof; and inputting into said electronic database by said user information representative of said animal's performance of said desired behavior, wherein said electronic database displays further information for the user to improve the animal's performance of said desired behavior.

2. The method of claim 1 wherein the step of selecting one of said training information data files regarding an animal comprises selecting and outputting a combination of textual, audio and video information.

3. The method of claim 1 wherein said audio information in said database comprises audio information which includes a selected tonal emphasis to demonstrate to a user the proper tone to use when prompting an animal to perform a desired behavior.

4. The method of claim 1 wherein said electronic database comprises input controls.

5. An apparatus for providing training information regarding an animal to a user comprising:

an electronic database which database has stored training information data files representative of animal behavior, animal identification, animal selection, animal characteristics, animal training, and animal care, and combinations thereof;

input controls for selecting one of said stored training information data files and for inputting information representative of said animal's performance of a desired behavior; and output controls for outputting said training information data files to an electronic device, said electronic device selected from the group consisting of a video display, audio output, and combinations thereof, and said information includes further information for the user to improve the animal's performance of said desired behavior.

* * * * *